United States Patent [19]

Ball et al.

[11] 4,032,353

[45] * June 28, 1977

[54] LOW POROSITY AGGREGATE-CONTAINING CEMENT COMPOSITION AND PROCESS FOR PRODUCING SAME

[75] Inventors: Frank J. Ball, Charleston; David V. Braddon, Charleston Heights; Lynden J. Stryker, Mount Pleasant, all of S.C.

[73] Assignee: Westvaco Corporation, New York, N.Y.

[ * ] Notice: The portion of the term of this patent subsequent to June 1, 1993, has been disclaimed.

[22] Filed: May 24, 1976

[21] Appl. No.: 689,513

Related U.S. Application Data

[63] Continuation-in-part of Ser. No. 569,986, April 2, 1975, Pat. No. 3,960,582.

[52] U.S. Cl. .................................. 106/90; 106/97; 106/314; 106/315

[51] Int. Cl.² ........................................ C04B 7/35

[58] Field of Search ............... 106/90, 97, 98, 104, 106/117, 118, 119, 314, 315

[56] References Cited

UNITED STATES PATENTS

| | | | |
|---|---|---|---|
| 2,646,360 | 7/1953 | Lea ........................ | 106/90 |
| 3,689,294 | 9/1972 | Brunauer ............... | 106/90 |
| 3,782,984 | 1/1974 | Allemand et al. ..... | 106/90 |
| 3,960,582 | 6/1976 | Ball et al. .............. | 106/90 |

*Primary Examiner*—J. Poer
*Attorney, Agent, or Firm*—Richard L. Schmalz; Ernest B. Lipscomb, III

[57] ABSTRACT

Disclosed herein are low porosity aggregate-containing cement compositions comprising hydraulic cement containing substantially no calcium sulfate at least 0.1% alkali bicarbonate by weight based on dry ground cement, and at least 0.1% of a lignosulfonate or sulfonated lignin by weight based on dry ground cement, said aggregate-containing cement composition having been made at a water-to-cement ratio of between 0.4 and 0.15. Also, disclosed are methods for producing these low porosity aggregate-containing cements.

20 Claims, No Drawings

LOW POROSITY AGGREGATE-CONTAINING CEMENT COMPOSITION AND PROCESS FOR PRODUCING SAME

CROSS-REFERENCE TO RELATED APPLICATION

This application is a continuation-in-part of application Ser. No. 569,986, filed Apr. 21, 1975, now U.S. Pat. No. 3,960,582 which issued June 1, 1976.

BACKGROUND OF THE IVENTION

1. Field of the Invention

This invention relates to a low-porosity aggregate-containing cement and methods for making same. More particularly, the invention relates to low porosity aggregate-containing cement made from a gypsum-free hydraulic cement which includes alkali bicarbonates and lignosulfonates and gives cements having an extended set time, reduced expansion due to alkali-aggregate reactions and other benefits.

Cements are produced by calcining suitable raw materials, generally a mixture of calcareous and argillaceous materials, to produce a sintered "clinker." Portland types are by far the most important cements in terms of quantity produced. The clinker is conventionally mixed with gypsum, i.e., up to about 9%, and ground, usually in some type of ball mill, to a finely divided state having a relatively large surface area to yield the finished cement.

The ground clinker containing gypsum is mixed with the proper amount of water to form a paste. Properly made cement pastes set within a few hours and then harden slowly. Cement pastes are combined with aggregates, either fine aggregates such as sand to produce mortars or larger aggregates as gravel, stone and the like to produce concrete. The paste acts as the cementing material and its composition has a decisive effect on the strength and other properties of the resultant mortar or concrete.

One of the main factors that determine the properties of hardened cement pastes and, consequently of mortar and concrete, is the water-to-cement ratio of the fresh mix. The lower the water-to-cement ratio the higher the strength, lower the shrinkage, and better the frost and corrosion resistance. The desirability of having a low water-to-cement ratio, the conventional practice being normally between about 0.4 and 0.6, is to obtain a concrete or mortar having minimum shrinkage and increased ultimate strength. However, simply lowering the water-to-cement ratio of conventional portland cements is not the answer.

Thus, unfortunately the fact that a decrease of the water content improves the properties of the hardened concrete can be used only to a limited degree as a decrease of the water content results simultaneously in a deterioration of the workability of the concrete mix. The requirements for sufficient workability of the fresh concrete mix are the reasons for the fact that the water content of concrete mixes used in practical applications lies far above the amount that is needed for complete hydration of cement. While the amount of water needed for complete hydration of cement is stated to be about 22-23%, the lowest amount of water used in conventional concrete practice lies in the vicinity of 40% and usually ranges between 45% and 80%.

Even through the use of conventional water reducers (mainly lignosulfonate from spent sulfite pulping liquors), a water reduction of only about 10% of the water added is possible. The water remaining in the concrete mix made from ordinary cement is still far above the requirements needed for complete hydration of the cement. Thus, if the water content could be further reduced without deterioration of the workability or without introducing other detriments, a significant gain in strength and an improvement of some other properties of the hardened concrete could be reached.

2. The Prior Art

Efforts to produce low porosity cements by reduction of water-to-cement ratio have been long attempted. For example, U.S. Pat. No. 2,174,051 to Winkler teaches that an increase in strength is obtained with a low water-to-cement ratio and that certain organic compounds such as tartaric acid, citric acid and the like may be added to regulate the setting time.

U.S. Pat. No. 2,374,581 to Brown teaches that small amounts of tartaric acid, tartrates and bicarbonates may be added to ordinary (gypsum containing) portland cement at conventional water-to-cement ratios to retard the rate of set at high temperatures in the cementing of oil wells.

U.S. Pat. No. 2,646,360 to Lea teaches that an alkali metal or alkaline earth metal lignin sulfonate and an alkali metal salt of an inorganic acid (e.g., sodium carbonate) may be added to a gypsum containing cement slurry to reduce water loss and thus the amount of water initially needed.

U.S. Pat. No. 3,118,779 to Leonard, on the other hand, teaches that sodium bicarbonate when added to a portland cement-Type III (containing gypsum) without lignin being present acts as an accelerator.

U.S. Pat. No. 3,689,296 to Landry teaches that formaldehyde modified calcium lignosulfonates may be used in portland cements to replace all or part of the gypsum usually added and the amount of water required for a mix of a given degree of fluidity is reduced.

U.S. Pat. No. 3,689,294 to Braunauer reflects more recent effort to produce low porosity cements by grinding portland-type cements without gypsum to a specific surface area between 6,000 – 9,000 Blaine (cm.$^2$/gm.) and mixing with alkali or alkaline earth lignosulfonate, alkali carbonate and water.

U.S. Pat. No. 3,782,984 to Allemand et al. teaches that the addition of 0.5 to 5% of alkali metal carbonates to portland-type cements accelerates the setting time.

The French publication *Les Adjuvants Du Ciment* edited by Albert Joisel (Soisy, France 1973 published by the author) at page 102 teaches that sodium bicarbonate in ordinary portland cement is a retarder and again at page 132 that sodium bicarbonate may be added to portland cement with gypsum in the usual way.

The above-described prior art is intended as exemplary and not inclusive of all low porosity cement art.

It is, therefore, a general object of this invention to provide processes for making an improved low porosity, free-flowing aggregate-containing cement.

Another object of this invention is to provide concretes and mortars containing a high strength, low porosity hydraulic cement without gypsum with improved workability, extended set time and reduced expansion due to alkali aggregate reactions.

A further object of this invention is to provide an improved low porosity, free-flowing cement by including sodium bicarbonate as an additive.

Other objects, features and advantages of this invention will become evident from the following detailed description of the invention.

SUMMARY OF THE INVENTION

Low-porosity, aggregate-containing cements are disclosed which include ground hydraulic cement without gypsum, at least 0.1% of a lignosulfonate or sulfonated lignin, at least 0.1% of an alkali bicarbonate having been mixed with 15 to 40% water. These products and the processes for making them show the desirability of using alkali bicarbonates in low porosity cement rather than alkali carbonates.

DETAILED DESCRIPTION OF THE INVENTION

The cement to which this invention is applicable is "hydraulic cements." Hydraulic cements include, but are not limited to, the portland cements, the natural cements, the white cements, the aluminous cements, the grappies cements, the hydraulic limes, and the pozzolanic cements including those derived from industrial slags. The hydraulic cement which is most widely used is portland cement. Clinkers of the above-described types are ground to 2,000 cm.$^2$/gm. and finer, e.g., up to 9,000 cm.$^2$/gm., but usually about 3,000 to 6,000 cm.$^2$/gm.

To assist in obtaining the desired fineness, it is common practice in the cement industry to employ grinding aids which increase the efficiency of the grinding operations. Satisfactory grinding aids include, among others, water-soluble polyols such as ethylene glycols, polyethylene glycols, as well as, other water-soluble diols. The grinding aids are generally added to the clinker in an amount of from 0.005 to 1.0% based on weight of cement, and the ground cement may include a pack set inhibitor. Additional examples of grinding aids may be found in U.S. Pat. Nos. 3,615,785 and 3,689,294. Although grinding aids are typically used to make the cement, they do not form a part of the present invention.

The present invention thus starts with a ground hydraulic cement without gypsum. The term "without gypsum" means no gypsum has been added to the cement but does not preclude naturally occurring sulfates or sulfates occurring from reaction of $SO_2$ with clinker during calcining. Using the process of this invention, low porosity mortars and concretes may be made from the cement pastes. As used herein, the term "low porosity" cement is defined as a free-flowing and workable cement having a water-to-cement (w/c) ratio of below 0.40 down to about 0.15, with workable mortars and concrete preferably from 0.35 down to 0.20 w/c ratio.

The hydraulic cement without gypsum in one embodiment of the process is combined with at least 0.1%, based on the weight of dry ground cement of an alkali metal lignosulfonate, an alkaline earth metal lignosulfonate, or an alkali metal salt of a sulfonated lignin, alkaline earth metal salt of a sulfonated lignin, or an ammonium salt of a sulfonated lignin. The amount of lignosulfonate or sulfonated lignin added performs desirably up to say 1.5 to 3.0%. Dosages up to 5.0% do not lose excessive strength, but the amount used will depend upon the particular clinker used and amount of aggregate employed. The lignosulfonates are obtained as byproducts from sulfite pulping of woody materials. The waste liquors from such pulping contain large quantities of lignin and lignin products in conjunction with other materials. The sulfonated lignins, on the other hand, are produced by reacting lignins obtained from alkali pulping, acid hydrolysis or other known recovery process with an inorganic sulfite, e.g., sodium sulfite, whereby sulfonate groups are added to the lignin. For use in this invention, any of the various water-soluble sulfonated lignins or lignosulfonates may be employed. It is preferable, however, to utilize sulfonated lignins which are free of carbohydrate materials. Sulfonated lignins obtained from reaction of sulfites with alkali lignin do not contain any appreciable amounts of these carbohydrates and consequently may be employed as is. The sulfonated lignins may be converted into water-soluble ammonium, alkali metal salts or alkaline earth metal salts, and used as such, as disclosed in U.S. Pat. No. 2,141,570.

In the alternative embodiments of the process, the sulfonated lignin or lignosulfonates may be combined with the ground cement or with the mix water or a portion of the sulfonated lignin may be added to the cement and a portion added in the mix water. No essential differences in results are observed when using any of these procedures. Therefore, a portion of the lignin may be combined with the ground cement and the remaining portion added to the mix water.

An alkali bicarbonate in the amount of at least 0.1% by weight based on the dry cement is employed. Usually, no more than 2.0% bicarbonate is needed; but with some clinkers the amount of bicarbonate may beneficially be even higher. The amount of bicarbonate may be that amount which will saturate the water used to make the cement. Although normally unnecessary, an amount of bicarbonate up to say 5.0% may be tolerated. The water-to-cement will, of course, affect the amount of saturated bicarbonate. for example, at 25% and a w/c ratio of 0.2, about 2.3% sodium bicarbonate may be saturated; while at a w/c ratio of 0.4, about 4.6% sodium bicarbonate may be saturated. Sodium bicarbonate is preferred. It is unimportant how the bicarbonate is added, such as by straight inclusion of a bicarbonate or by adding soda ash and carbonating. Another useful source of bicarbonate is trona. It was found that when the alkali bicarbonate was used an unexpected increase in set time and workability over the use of alkali carbonate is obtained at water-to-cement ratios below 0.4. The amount of water used is 15 to 40% by weight based on dry cement or a water-to-cement ratio (w/c) of 0.4 to 0.15, preferably 0.4 to 0.2.

It may also be desirable in some cases to add a third component to the low porosity system to obtain substantial lengthening of the plastic period for mortars and concretes while still having adequate one-day compressive strengths. These components used in small amounts, for example, 0.1 – 0.2%, are primarily of two classes of materials; surfactants and conventional water reducer/set retarders. Anionic surfactants may include the sodium salt of sulfonated alkalidiphenyloxide, while nonionic surfactants include polyethylene glycol and the like. Materials of the water reducer/set retarder class include carbohydrates like wood molasses sucrose, dextrose, and hydroxy acids like sodium gluconate. Typical air detraining agents, such as tributyl phosphate, may also be used to advantage in low porosity systems.

Another important aspect of this invention is that it was found that the addition of alkali bicarbonate substantially reduces the potential for the alkali-aggregate reaction that take places when alkali (NaOH) is formed ate was adjusted to provide equivalent molar quantities of $CO_3^=$.

TABLE I

COMPARISON OF ALKALI CARBONATES AND BICARBONATES ON THE PROPERTIES OF LP CEMENT PASTES

| Run No. | Type Carbonate | % | Flow* | Setting Time (Min.) | Compressive Strength (p.s.i.) 1 Day | 7 Days |
|---|---|---|---|---|---|---|
| 1 | $Na_2CO_3$ | 1.26 | 4+ | 13 | 10,400 | 11,600 |
| 2 | $NaHCO_3$ | 1.0 | 4+ | 38 | 10,200 | 18,950 |
| 3 | $K_2CO_3 \cdot 1.5 H_2O$ | 1.97 | 4 | 12 | 10,900 | 13,500 |
| 4 | $KHCO_3$ | 1.19 | 4+ | 19 | 9,600 | 16,580 |

Note:
*Arbitrary flow units, see explanation below and are those used in all the examples. The consistencies of the cement pastes shown in Table I are according to the following scale:
1. Paste barely plastic, moves with difficulty even when vibration is applied.
2. Paste plastic but not freely flowing - flows easily when vibration is applied.
3. Paste freely flowing, but thick, can be poured without vibration.
4. Paste easily flowing.

in the cement. The potential expansion when using an alkali carbonate and bicarbonate in low porosity systems was measured using a highly reactive aggregate (crushed pyrex glass) according to the procedure outlined in A.S.T.M. C-227. The results demonstrated a reduced expansion of a low porosity mortar prepared with $NaHCO_3$ when compared to an equivalent $Na_2CO_3$ system.

The practice of this invention may clearly be seen in the following examples.

EXAMPLE 1

This example is to illustrate the lengthened set time of cement paste made using an alkali bicarbonate rather than an alkali carbonate. A Type I portland cement clinker ground to 5,075 cm.²/gm. (A.S.T.M. C-204) having the following analysis was used in this example:

| | Clinker % |
|---|---|
| $SiO_2$ | 21.70 |
| $Al_2O_3$ | 6.06 |
| $Fe_2O_3$ | 2.51 |
| CaO | 67.5 |
| MgO | 0.99 |
| $Na_2O$ | 0.06 |
| $K_2O$ | 0.28 |
| Ignition Loss | 0.62 |
| Insoluble | 0.14 |

The changes in physical properties (set time being the most dramatic) of cement pastes using alkali carbonates and alkali bicarbonates are illustrated in Table I. The amount of sulfonated lignin was held constant at 0.45% by weight based on the cement, and the water-to-cement ratio was 0.25. The amount of alkali carbon- The results in Table I demonstrate increases in set time and superior 7-day compressive strength for bicarbonate systems over carbonate systems.

EXAMPLE 2

This example demonstrates that the sulfonated lignin may be dry blended or dissolved in the mix water. In this example, a portion of the clinker from Example 1 was ground to a Blaine surface of 4,525 cm.²/gm. The mixing scheme designation in Table II denotes mixing all of the components within a set of parentheses and then mixing with the next component or components. For example, Run No. 1 in Table II designates blending the cement (C), the sulfonated alkali lignin (LS) and the alkali carbonate (AC), in this run; the alkali carbonate was sodium bicarbonate, and subsequently mixing the water. The amount of sulfonated lignin was held constant at 0.35% by weight based on the cement, and the water-to-cement ratio was 0.25.

TABLE II

EFFECTS OF MIXING SEQUENCE ON THE PROPERTIES OF LP CEMENT PASTES

| Mixing Scheme | Type Carbonate | % | Flow | Setting Time (Min.) | Compressive Strength (p.s.i.) 1 Day | 7 Days |
|---|---|---|---|---|---|---|
| 1. (C + LS + AC) + W | $NaHCO_3$ | 0.80 | 4+ | 32 | 9,200 | 17,250 |
| 2. (C + AC) + (LS + W) | $NaHCO_3$ | 0.80 | 4+ | 36 | 10,700 | 18,350 |

The data in Table II clearly demonstrate that the sulfonated lignin may be added to either the mix water or dry blended with the cement without significantly altering the paste properties.

EXAMPLE 3

This example further illustrates the superior low porosity cement pastes prepared using $NaHCO_3$ instead of $Na_2CO_3$ from ground cement with varying surface areas using Type I clinkers from various sources. Table III demonstrates the comparative longer set times and higher 7-day compressive strengths for the $NaHCO_3$ low porosity cement systems. The water-to-cement ratio was 0.25 in each Run. The amount of alkali carbonate was adjusted to provide approximate equivalent molar quantities of $CO_3^=$ for each clinker at each surface area.

TABLE III

EFFECTS ON DIFFERENT CLINKER AND SURFACE AREA ON LP CEMENT PASTE PROPERTIES

| Clinker | Surface Area Cm.²/gm. | Type Carbonate | % | Flow | Setting Time (Min.) | Compressive Strength (p.s.i.) 1 Day | Compressive Strength (p.s.i.) 7 Days |
|---|---|---|---|---|---|---|---|
| B[1] | 6,500 | NaHCO₃ | 1.20 | 4 | 31 | 10,100 | 15,400 |
| B[1] | 6,500 | Na₂CO₃ | 1.60 | 4 | 18 | 11,700 | 12,200 |
| A[2] | 5,650 | NaHCO₃ | 0.60 | 4 | 49 | 7,500 | 19,550 |
| A[2] | 5,650 | Na₂CO₃ | 0.76 | 2 | 20 | 10,200 | 14,050 |
| C[3] | 4,800 | NaHCO₃ | 1.00 | 4+ | 63 | 11,800 | 17,900 |
| C[3] | 4,800 | Na₂CO₃ | 1.26 | 4+ | 32 | 12,500 | 13,200 |

Notes:
[1] 0.80% sulfonated lignin.
[2] 0.45% sulfonated lignin.
[3] 0.50% sulfonated lignin.

EXAMPLE 4

The use of alkali bicarbonates rather than alkali carbonates also improves the fluidity in cases where marginal fluidity occurs. The examples in Table IV illustrate these points wherein equimolar amounts of $CO_3^=$ were mixed with each of the ground clinkers at each surface area.

TABLE IV

FLOW ENHANCEMENT OF LP CEMENT PASTES PREPARED WITH ALKALI BICARBONATES

| Clinker | Surface Area Cm.²/gm. | Type Carbonate | % | Flow | Setting Time (Min.) | Compressive Strength (p.s.i.) 1 Day | Compressive Strength (p.s.i.) 7 Days |
|---|---|---|---|---|---|---|---|
| A[1] | 5,650 | Na₂CO₃ | 0.76 | 1-2 | 9 | 8,800 | 13,150 |
| A[1] | 5,650 | NaHCO₃ | 0.60 | 4 | 35 | 9,700 | 18,000 |
| C[2] | 5,325 | Na₂CO₃ | 1.26 | 3 | 13 | 11,400 | 13,500 |
| C[2] | 5,325 | NaHCO₃ | 1.0 | 4+ | 59 | 12,500 | 13,350 |

Note: [1] 0.45% sulfonated lignin.
[2] 0.50% sulfonated lignin.

These results show that cement pastes made with ground clinkers using sodium bicarbonate had superior flow properties.

EXAMPLE 5

Extension of setting times using bicarbonates are also observed if lignosulfonates isolated from sulfite waste liquors are employed. Overall properties are, however, superior if sulfonated alkali lignins are utilized (compare Examples 1-4 with Example 5 below).

TABLE V

COMPARISON OF ALKALI BICARBONATE AND ALKALI CARBONATE WITH A LIGNOSULFONATE DERIVED FROM SULFITE PULPING

| Type Carbonate | % | Flow | Setting Time (Min.) | Compressive Strength (p.s.i.) 1 Day | Compressive Strength (p.s.i.) 7 Days |
|---|---|---|---|---|---|
| Na₂CO₃ | 1.51 | 2 | 32 | 10,200 | 15,250 |
| NaHCO₃ | 1.20 | 2 | 72 | 500 | 7,550 |

EXAMPLE 6

This example clearly shows that a low porosity, ground pyrex glass mortar prepared with NaHCO₃ expands significantly less when compared to the corresponding low porosity mortar using Na₂CO₃. Samples C-1 and C-2 in Table VI demonstrate the reduced 14-day and 28-day expansion observed when Na₂CO₃ is replaced with NaHCO₃ (to give equimolar $CO_3^=$) in the low porosity pyrex glass mortar following the procedure outlined in A.S.T.M. C-227. Samples C-3 and C-4 show a significant reduced expansion in both the NaHCO₃ and Na₂CO₃ low porosity systems when a lithium salt (Li₂CO₃) is incorporated into the ground pyrex mortar. These results illustrate the reduced expansion of a low porosity pyrex mortar when replacing an alkali carbonate with an alkali bicarbonate and also a reduction in expansion of both the Na₂CO₃ and NaHCO₃ low porosity mortars when a lithium carbonate is incorporated into the mix.

TABLE VI

EXPANSION OF LOW POROSITY PYREX GLASS MORTAR BARS PREPARED WITH VARIOUS ALKALI CARBONATES

| Sample | Alkali Carbonate | % | Expansion, % 14 Days | Expansion, % 28 Days |
|---|---|---|---|---|
| C-1 | NaHCO₃ | 1.00 | 0.24 | 0.32 |
| C-2 | Na₂CO₃ | 1.26 | 0.50 | 0.56 |
| C-3 | NaHCO₃ | 1.00 | | |
| | Li₂CO₃ | 0.22 | 0.03 | 0.04 |
| C-4 | Na₂CO₃ | 1.26 | | |
| | Li₂CO₃ | 0.22 | 0.01 | 0.08 |

Notes:
Glass:Cement = 1.80
0.50% sulfonated lignin
w/c = 0.275

EXAMPLE 7

This example serves to illustrate the strength properties of low porosity (LP) mortars obtained using a process of this invention at acceptable water-to-cement ratios compared to ordinary water-to-cement ratios. The mortar was prepared using 2.25 parts fine sand per one part cement.

TABLE VII

| Cement | w/c | Compressive Strength (p.s.i.) 1 Day | Compressive Strength (p.s.i.) 7 Days |
|---|---|---|---|
| LP[1] | .40 | 4,200 | 8,000 |
| LP[1] | .32 | 6,000 | 9,300 |
| LP[1] | .27 | 6,000 | 8,800 |
| Type III Ordinary | .60 | 2,300 | 7,100 |

Note:
[1] 0.50% sulfonated lignin, 1.0% NaHCO₃

The results show that good strength is maintained in the low porosity aggregates.

EXAMPLE 8

This example illustrates the properties of low porosity mortars obtained at various sodium salt of a sulfonated alkali lignin and sodium bicarbonate dosages. The cement used was that from Example 1 ground to 5,500 cm.$^2$/gm. Mortars were prepared using various parts of fine sand (A.S.T.M. C-109 Ottawa) per one part cement. The results are shown in Table VIII.

TABLE VIII

| Lignin, % | NaHCO$_3$, % | Water-to-Cement | Aggregate to Cement | Flow* % | Set Time (hours) | Compressive Strength (p.s.i.) 1 Day | Compressive Strength (p.s.i.) 7 Days |
|---|---|---|---|---|---|---|---|
| 1.5 | 0.4 | 0.25 | 1.75 | 109 | 1.0 | — | 9,138 |
| 1.5 | 0.4 | 0.36 | 2.25 | 39 | 0.5 | 150 | 5,175 |
| 3.0 | 0.5 | 0.38 | 2.25 | 59 | 3.5 | 1,400* | 1,538* |
| 0.5 | 3.5 | 0.34 | 2.25 | 16 | 0.5 | 6,700 | 9,875 |
| 3.0 | 0.4 | 0.27 | 2.25 | 67 | 1.5 | 100$^c$ | 3,225$^c$ |

Notes:
*Flow measured according to A.S.T.M. C-305.
*Cured at 60° C., 100% relative humidity.
$^c$Cured according to A.S.T.M. C-684.

The results clearly show the effectiveness of mortars made at various lignin and bicarbonate dosages according to this invention.

EXAMPLE 9

This example illustrates the properties of low porosity concrete made at high lignin dosages using the sodium salt of an alkali lignin and 0.5% sodium bicarbonate. The cement was from Example 1 ground to 5,500 cm.$^2$/gm. The concrete was 3.5 parts aggregate per part of cement. The aggregate was 1 part sand (A.S.T.M. C-109 Ottawa) and 2.5 parts coarse aggregate. The water-to-cement ratio was 0.26. When lignin was added at 3.0%, the set time was 1.5 hours and at 5.0% lignin addition the set time was 2.0 hours.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A low porosity, aggregate-containing cement composition comprising;
    a. a hydraulic cement having a fineness above about 2,000 cm.$^2$/gm. without gypsum,
    b. alkali bicarbonate in an amount at least 0.1% by weight based on dry ground cement,
    c. a lignin selected from the group consisting of alkali metal lignosulfonate, alkaline earth metal lignosulfonate, ammonium lignosulfonate, alkali metal salt of sulfonated lignin, alkaline earth metal salt of sulfonated lignin and ammonium salt of sulfonated lignin in an amount of at least 1.0% by weight based on dry ground cement, and
    d. said aggregate-containing cement composition having been made at a water-to-cement ratio between 0.4 and 0.15.

2. The aggregate-containing cement composition of claim 1 wherein said cement is ground to a fineness from 3,000 cm.$^2$/gm. to 6,000 cm.$^2$/gm.

3. The aggregate-containing cement composition of claim 2 wherein said alkali bicarbonate is sodium bicarbonate and is present in an amount from 0.1 to 2.0%; and said water-to-cement ratio is from 0.4 to 0.2.

4. The aggregate-containing cement composition of claim 3 wherein said lignin is an alkali metal salt of a sulfonated lignin.

5. The aggregate-containing cement composition of claim 3 wherein said lignin is present in an amount at least 1.5% by weight based on dry ground cement.

6. The aggregate-containing cement composition of claim 3 wherein said lignin is present in an amount from 1.5 to 5.0% by weight based on dry ground cement.

7. A low porosity, aggregate-containing cement composition comprising;
    a. a hydraulic cement having a fineness above about 2,000 cm.$^2$/gm. without gypsum,
    b. alkali bicarbonate in an amount at least 2.0% by weight based on dry ground cement,
    c. a lignin selected from the group consisting of alkali metal lignosulfonate, alkaline earth metal lignosulfonate, ammonium lignosulfonate, alkali metal salt of sulfonated lignin, alkaline earth metal salt of sulfonated lignin and ammonium salt of sulfonated lignin in an amount of at least 0.1% by weight based on dry ground cement, and
    d. said aggregate-containing cement composition having been made at a water-to-cement ratio between 0.4 and 0.15.

8. The aggregate-containing cement composition of claim 7 wherein said cement is ground to a fineness from 3,000 to 6,000 cm.$^2$/gm.

9. The aggregate-containing cement composition of claim 8 wherein said lignin is present in an amount from 0.1 to 1.5% by weight based on dry ground cement; and said water-to-cement ratio is from 0.4 to 0.2.

10. The aggregate-containing cement composition of claim 7 wherein said lignin is present in an amount from 1.5% to 5.0% by weight based on dry ground cement.

11. The aggregate-containing cement composition of claim 10 wherein said alkali bicarbonate is sodium bicarbonate and is present in an amount from 2.0% to saturated solutions.

12. The aggregate-containing cement composition of claim 10 wherein said lignin is an alkali metal salt of a sulfonated lignin.

13. A method of making a low porosity, free-flowing cement composition comprising;
    a. combining ground hydraulic cement without gypsum with at least 0.1% of an alkali bicarbonate,
    b. combining 15 to 40% of water with at least 1.0% of a lignin selected from the group consisting of alkali metal lignosulfonates, alkaline earth metal lignosulfonates, ammonium lignosulfonates, alkali metal salt of sulfonated lignin, alkaline earth metal salt of sulfonated lignin and ammonium salt of sulfonated lignin, and c. thereafter mixing together the combined materials of steps (a) and (b), all percentages based on dry weight of ground cement.

14. The method according to claim 13 wherein said alkali bicarbonate is sodium bicarbonate and is present in an amount from 0.1 to 2.0%; and said water is from 20 to 40%.

15. The method according to claim 14 wherein said lignin is an alkali metal of a sulfonated lignin.

16. The method according to claim 15 wherein said lignin is present in an amount from 1.5 to 5.0%.

17. A method of making a low porosity, free-flowing aggregate-containing cement composition comprising;

a. combining ground hydraulic cement without gypsum with at least 2.0% of an alkali bicarbonate, b. combining 15 to 40% of water with at least 0.1% of a lignin selected from the group consisting of alkali metal lignosulfonates, alkaline earth metal lignosulfonates, ammonium lignosulfonates, alkali metal salt of sulfonated lignin, alkaline earth metal salt of sulfonated lignin and ammonium salt of sulfonated lignin, and c. thereafter mixing together the combined materials of steps (a) and (b), all percentages based on dry weight of ground cement.

18. The method according to claim 17 wherein said lignin is an alkali metal salt of a sulfonated lignin; and said water is present from 20 to 40%.

19. The method according to claim 18 wherein said lignin is present in an amount from 0.1 to 1.5%.

20. The method according to claim 17 wherein said alkali bicarbonate is sodium bicarbonate and is present in an amount from 2.0% to saturated solutions.

* * * * *